Dec. 21, 1943.  J. L. HATHAWAY  2,337,328
ELECTRICAL MEASURING CIRCUIT
Filed Dec. 30, 1941  2 Sheets-Sheet 2
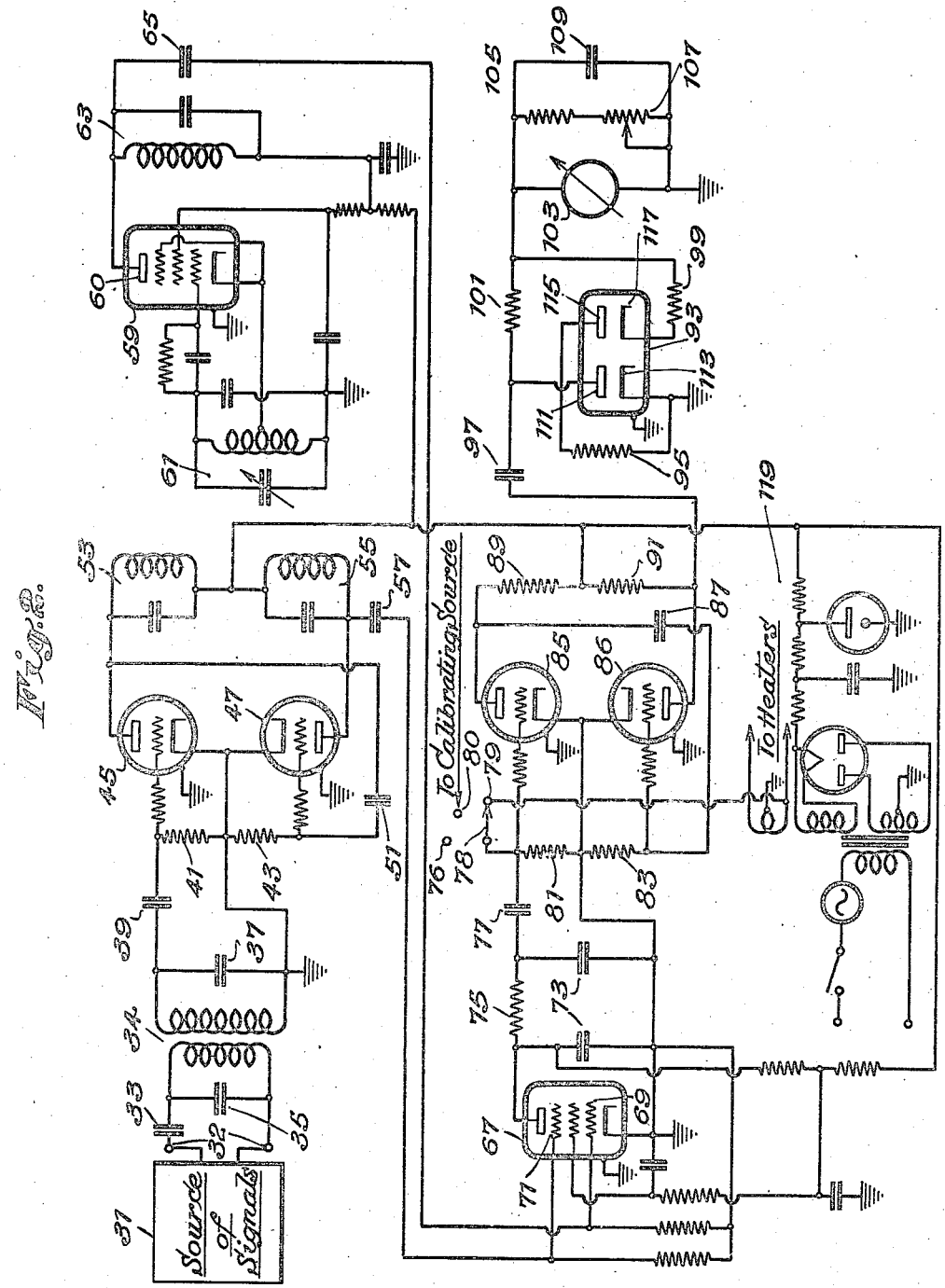
INVENTOR
Jarret L. Hathaway
BY H. S. Grover
ATTORNEY Patented Dec. 21, 1943

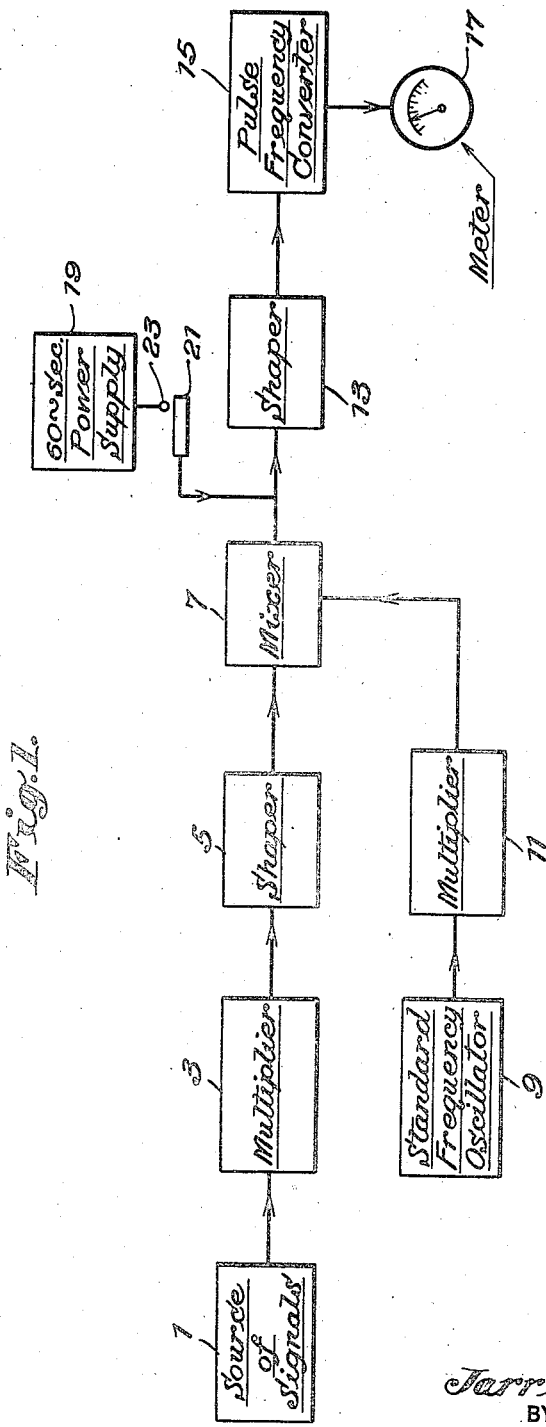

2,337,328

UNITED STATES PATENT OFFICE 2,337,328

ELECTRICAL MEASURING CIRCUIT

Jarrett L. Hathaway, Cambridge, Mass., assignor to Radio Corporation of America, a corporation of Delaware Application December 30, 1941, Serial No. 425,001

5 Claims. (Cl. 172—245)

This invention relates to electrical measuring circuits and, in particular, to a method and apparatus for measuring the frequency and variation of frequency of recurrent wave energy.

My invention provides a simple means for measuring both the frequency and, more particularly, frequency deviations from a predetermined frequency of a source of signalling energy, and utilizes a new and simple method for obtaining a high degree of precision in the final measurements. Moreover, my invention provides a simple means for calibrating the apparatus.

Briefly, my invention utilizes the method of multiplying the frequency of the signals to be measured and comparing the signals with a source of standard frequency whose value of frequency is of the same order as that of the multiplied frequency. The difference between the source of signals whose frequency is to be measured and the source of the standard frequency is then used to derive a series of pulses having substantially constant amplitude, which pulses are thereafter passed through a differentiating device. The output of the differentiating device may thereafter be read on a meter. To obtain the frequency, therefore, of the unknown source, it is merely necessary to add (or subtract) the measured frequency to (or from) the frequency of the standard frequency. When the frequency of the source of standard frequency is below the frequency of the source of unknown frequency, the sum will give the frequency of the unknown signals.

Such apparatus is particularly useful where the frequencies being considered are relatively low, especially since multiplication of the frequency of the signals to be measured is provided. This provision brings about an incrased sensitivity to frequency deviation because at low frequencies relatively small shifts in phase angle or frequency are difficult to measure. By multiplying the frequency of the original signals, the shift in phase angle or frequency are correspondingly increased and consequently can be measured with greater ease and increased accuracy. Accordingly, it will be appreciated that the main object of my invention is to provide an improved method and apparatus for measuring frequency and deviations from a specified frequency.

Another object of my invention is to provide a method of measuring frequency deviations in which enhanced precision is obtained by multiplying the frequency of the signals whose frequency is to be measured.

Another object of my invention is to provide apparatus for measuring accurately frequency deviations directly and to incorporate a simple means for calibrating the direct reading measurement of the frequency deviation.

Another object of my invention is to provide an electronic apparatus for giving continuous readings of frequency and deviations from a specified frequency.

Another object of my invention is to provide a "wow" meter of improved accuracy, especially applicable to checking recordings, recording mechanism, or playback mechanism.

Other objects of my invention will become apparent to those skilled in the art upon reading the following detailed description in which reference will be made to the drawings.

In the drawings:

Figure 1 shows in block diagram form the essential components necessary to practice the method of my invention;

Figure 2 shows in considerable detail a circuit diagram of one embodiment of my apparatus.

Turning now to Figure 1, there is shown a source of signals 1 to be measured. The signals to be measured are multiplied in frequency by the frequency multiplier 3, and the multiplied signals in event that their shape is not sinusoidal, are thereafter shaped as, for example, by filtering by the shaper 5 to provide a substantially pure sinusoidal wave. Energy from standard frequency oscillator 9 is fed to a multiplier 11 which multiplies the standard frequency to a value which is of the same order as the order of the multiplied frequency from the source of signals 1. Energy from the shaper 5 and the multiplier 11 are fed to the mixer 7 for comparison purposes; that is to say, the mixer 7 may take the form of a conventional mixing tube such as is used in a heterodyne receiver. The output of the mixer, therefore, will include, in addition to other components, energy components whose frequency is equal to the difference between the multiplied frequency of the signals from the source 1 and the energy from the standard 9. Contained in the mixer is an appropriate filter for passing only the difference between the two frequencies and the other components of signal energies are by-passed or suppressed. The output, which is substantially sinusoidal as a result of the filtering action, is thereafter fed to the shaper 13 which converts the signals into signals having substantially constant amplitude and commonly called "square waves." These square waves, it will be appreciated, have a frequency which is equal to the difference between the two multiplied frequencies from the multipliers 3 and 11, respectively. Thereafter, the pulses are passed through the pulse frequency converter 15 which converter is substantially a differentiating circuit and produces an output which is proportional to the number of pulses passing through the circuit per unit of time. The output of the converter 15 is fed to a meter 17, and it will be readily apparent that the meter 17 gives a reading which is proportional to the number of pulses per unit of time or, in other words, the frequency deviation between the source of signals and the standard frequency oscillator.

It, of course, will be apparent that knowing the frequency of the standard oscillator 9, this enables the frequency of the source of signals 1 to be readily ascertained, since the frequency must be equal to the algebraic sum of the frequency of the standard oscillator 9 and the frequency deviation measured by the meter 17.

It is desirable, in order to have enhanced accuracy in some cases, to choose the frequency of the standard oscillator 9 such that when multiplied by the multiplier 11, it will give substantially zero beat frequency with frequency multiplied signals of the source 1. However, in certain applications, it may be desirable to provide the standard oscillator with such a frequency that the initial reading of the meter will be several hundred cycles per second and to permit the deviations to decrease or increase this value. However, whether zero beat frequency or a frequency of several hundred cycles is provided, is a matter of choice and depends upon the specifice application of the circuit without in any way causing any difference in principle of operation.

In Figure 2 I have shown, as an example and in order to provide a very clear understanding and appreciation of my invention, a circuit diagram of apparatus embodying my invention and particularly suitable for measuring wows of sound tracks. As is well known, a wow is a small frequency deviation which is set up in recording apparatus due to non-synchronous speed during the intervals of reproduction as compared with the rate of recording. These frequency deviations are generally of low value but are particularly disturbing on sustained notes where they introduce an effect of a slow tremolo. Since the frequency deviation is small, it has been difficult in the past to obtain a measurement of the wow with any appreciable accuracy. However, by the circuit shown in Figure 2, this difficulty has been overcome.

In the figure, a source of signals which may, for example, be a phonograph record having a 3,000 cycle note recorded thereon and a pickup arm which feeds the input terminals 32 of a tuned transformer 34. The transformer is tuned by the capacitors 35 and 37 connected across the primary and secondary respectively to provide peak resonance at 3,000 cycles. A capacitor 33 is useful to prevent any D. C. which may be present in any of the signals, from saturating the transformer. The secondary of the transformer 34 feeds energy to the tube 45 through a coupling capacitor 39. The tube 45 is arranged to have such bias as to provide multiplication and, in the example offered, the tuned resonant circuit 53 has its constant so chosen as to resonate at 15 kc. so that the tube 45 provides a multiplication of 5. The tube 47 offers amplification of the 15 kc. and, since it has an output circuit 55 which is also resonant at 15 kc., the output is substantially a pure sinuosidal wave. A stable oscillator of 7.5 kc. is provided by the tuned circuit 61 coupled to the cathode and control electrode of tube 59. Accordingly oscillations of a fixed frequency may be derived from the anode 60 of the tube 59. The generated oscillations are then applied to the tuned circuit 63, which is tuned to resonate at 15 kc. The constants of the circuit 63 are such as to give substantially pure sinusoidal wave output. By using the electronic coupling together with double frequency in the tuned circuit 63, the stability of frequency fed from the tube 59 is enhanced. Energy from the tuned circuit 63 is fed through the capacitor 65 to a control grid 69 of the mixing tube 67. Similarly, energy from the tuned circuit 55 is applied to another control electrode 71 of the tube 67. The output of the tube 67 is fed to a low pass filter comprising the resistor 75 and the condensers 73. The low pass filter consequently will pass only the difference between the two frequencies. The difference between the two frequencies is applied, by way of condenser 77, to the tube 85 which produces limiting and the output of the tube 85 appearing across the plate resistor 89 is fed to the tube 86 through a capacity 87 which provides still further limiting. As a result of amplifying and these two steps of limiting, the output of the tube 86 appearing across the resistor 91 has the so-called "square wave" form. These square wave pulses are thereafter fed through the capacitor 97 which acts as a differentiator to provide pulses whose area and shape are constant. The total area of these pulses is therefore proportional to frequency, since higher frequency provides more pulses in a given time. These pulses are rectified by the half wave diode rectifier 93. The resultant D. C. current flow in the metering circuit of the rectifier is therefore, over a range of incoming pulse rates, a direct linear function of this pulse rate. A meter 103 placed in the D. C. current path of the rectifier tube 93 will thus indicate the potential developed. This is then a function of the frequency difference of the original tone coming from the source of signals 31 and oscillator source coming from tube 59.

A smoothing circuit comprising the resistors 105 and 107 and the condenser 109 is provided to make the meter operate smoothly and without excessive jumping, as the frequency difference approaches zero. The resistor 95 connected to the anode 115 and the cathode 113 helps to reduce the static space-charge current of the rectifier 93 to substantially zero so that no correction for space current effects to the reading of the meter 103 is necessary. A conventional power supply 119 operated from a 60 cycle, 110 volt supply furnishes energy to the various amplifier tubes 45, 47, 59, 85, and 86. The apparatus may be calibrated by feeding to the contact 80 of the switch 78, a series of known low frequencies and observing the deflection of the meter 103. Of course, during calibration the source 31 is disconnected. For purposes of checking the calibration rapidly when the apparatus is used, a connection to the 60 cycle supply is provided through the contact 79 to the heater circuit. Normally the switch 78 is on the open contact 76 when measurements are being made. To check the calibration, the source of signals 31 is disconnected and the switch 78 is closed on contact 79 so as to provide 60 cycles on the grid of the tube 85. There will thus appear on the meter 103 a deflection which is equal to the deflection for a 60 cycle beat difference. By noting this reading, the meter may be adjusted by the resistor 107 to coincide with the calibration to read directly frequency deviations. It is to be noted that the value of capacity of the differentiating condenser 97 is somewhat critical. It must posssess a relatively high value of reactance at the pulse rate which is chosen to cause full scale deflection of the meter compared to the total load reactance comprising the rectifier and the meter so that a measurable amount of change of frequency is made apparent by the meter, when small changes in the frequency of the beat frequency tone occur. On the other hand, the reactance of the condenser must not be made too large, since then the total energy thereafter delivered to the indicating circuit will be so small as to require an ultra-sensitive instrument, which is not desirable for routine laboratory work. Ordinarily a value of .05 microfarads is suitable for use with conventional panel-mount meters whose full scale deflection is 200 microamperes, which meters are well known in the art and commonly used, assuming a full scale reading on about 100 c. p. s. difference frequency. It will be appreciated that, while a wow meter has been described in detail, this is only by way of example, and if any other source of frequency is to have its frequency deviation measured, then it is, of course, appreciated that the frequency of the oscillator which includes the tube 59 and differentiating condenser 97 may be properly changed. Moreover, while a specific form of oscillator has been shown, it will be appreciated that any other type of stable oscillator, such as a crystal control oscillator, can be substituted, and the same is true of the circuit arrangement shown for the multipliers and for the wave shaping circuits and filter circuits.

It will be apparent that if changes of frequency are to be measured above and below a specified frequency, the meter scale may be marked with zero at or near its mid scale. If the circuits are such as to require, say, a 50 c. p. s. difference frequency to produce this zero reading, the 50 c. p. s. beat may be obtained by operating the standard oscillator either above or below by the correct amount. Thus, if the standard oscillator is operated on the "high" side, a rise of the measured frequency produces a fall of meter reading. Conversely, with the oscillator on the "low" side of zero beat, a rise of measured frequency produces a rise of meter reading. The meter may obviously be calibrated in per cent frequency change above and below the specified value.

Various alterations and modifications of the present invention may become apparent to those skilled in the art and it is desirable that any and all such modifications and alterations be considered within the purview of the present invention except as limited by the hereinafter appended claims.

I claim:

1. A measuring system comprising a source of periodic electrical impulses, means for deriving energy representative of said impulses, a source of standard frequency, means for comparing the frequency of said derived energy with said standard frequency to produce a differential frequency, means responsive to the differential frequency to produce a corresponding series of impulses each of substantially fixed duration, and means responsive to the produced impulses for developing a potential difference having an intensity determined by the frequency of the impulses.

2. A measuring system comprising a source of periodic electrical impulses, means for deriving energy representative of said impulses, a source of fixed frequency, means for multiplying said fixed frequency, means for comparing the frequency of said derived energy with said multiplied frequency to produce a potential variation of rectangular wave form having a frequency corresponding to the differential frequency of the two compared frequencies, means responsive to the produced voltage variations to produce a corresponding series of impulses each of substantially constant duration, and means responsive to the produced impulses for developing a potential difference having an intensity determined by the frequency of the impulses.

3. A measuring system comprising a source of periodic electrical impulses, means for multiplying the frequency of said impulses, a source of standard frequency, means for multiplying said standard frequency, means for comparing the multiplied frequency of said impulses with said multiplied standard frequency to produce a differential frequency, means responsive to the differential frequency to produce a corresponding voltage variation of substantially rectangular wave form, means responsive to the voltage variations of rectangular wave form to produce a corresponding series of impulses each of substantially fixed duration, and means responsive to the produced impulses for generating a potential difference having an intensity determined by the frequency of the impulses.

4. The method of measuring a change in frequency of periodic electrical impulses which comprises the steps of deriving energy representative of the impulses whose change in frequency is to be measured, comparing the frequency of the derived energy with energy having a standard fixed frequency, deriving energy representative of the difference between the frequency of the derived energy and the frequency of the standard energy, converting the so derived energy to a potential variation of the rectangular wave form having a frequency corresponding to the differential frequency of the periodic electrical impulses and the standard frequency, developing a corresponding differential series of impulses from the voltage variations of rectangular wave form, the impulses being of constant duration irrespective of their frequency, and producing from the developed series of impulses a potential difference in accordance with the frequency of the impulses.

6. The method of measuring a change in the frequency of periodic electrical impulses which comprises the steps of deriving energy representative of the impulses whose change in frequency is to be measured, multiplying the frequency of the derived energy, heterodyning the multiplied frequency of the derived energy with energy having a predetermined fixed frequency, deriving energy representative of the difference between the multiplied frequency of the derived energy and the fixed frequency, converting the so derived energy to a voltage variation of substantially rectangular wave form and of a frequency corresponding to the differential frequency, producing a series of impulses of a corresponding differential frequency, each of the impulses being of substantially constant duration irrespective of their frequency, and producing a direct potential in an intensity determined by the frequency of the produced impulses.

JARRETT L. HATHAWAY.